(12) United States Patent
Chen

(10) Patent No.: US 11,005,516 B2
(45) Date of Patent: May 11, 2021

(54) PROTECTIVE CASE

(71) Applicant: PEGATRON CORPORATION, Taipei (TW)

(72) Inventor: Jian-Hua Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/809,156

(22) Filed: Mar. 4, 2020

(65) Prior Publication Data

US 2020/0366331 A1 Nov. 19, 2020

(30) Foreign Application Priority Data

May 16, 2019 (TW) .................................. 108206154

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC ........................................... H04B 1/3888
USPC ....................................................... 455/575.8
See application file for complete search history.

(56) References Cited

U.S. PATENT DOCUMENTS

| | | | |
|---|---|---|---|
| 8,379,377 B2* | 2/2013 | Walters | G06F 1/1652 361/679.04 |
| 9,746,884 B2* | 8/2017 | Lee | G06F 1/1626 |
| 10,120,421 B1* | 11/2018 | Hong | E05D 11/0054 |
| 10,162,386 B2* | 12/2018 | Chong | H04N 5/232933 |
| 10,222,835 B2* | 3/2019 | Lim | G06F 1/1652 |
| 10,551,880 B1* | 2/2020 | Ai | G06F 1/1641 |
| 10,694,623 B2* | 6/2020 | Park | G06F 1/1616 |
| 10,788,861 B2* | 9/2020 | Han | G06F 1/1616 |

(Continued)

FOREIGN PATENT DOCUMENTS

| | | |
|---|---|---|
| CN | 207835555 | 9/2018 |
| KR | 20140040895 | 4/2014 |

(Continued)

OTHER PUBLICATIONS

"Search Report of Europe Counterpart Application", dated Oct. 5, 2020, p. 1-p. 11.

(Continued)

*Primary Examiner* — April G Gonzales
(74) *Attorney, Agent, or Firm* — J.C. Patents

(57) ABSTRACT

A protective case for an electronic device is disclosed. The electronic device includes a stretchable display panel. The stretchable display panel includes a first side and a second side opposite to each other. The protective case includes a backplate, a first and a second housing. The backplate includes an accommodating space, where the accommodating space is adapted to accommodate the electronic device. The first housing is slidably disposed on the backplate, and the first housing is adapted to abut against the first side of the stretchable display panel. The second housing is slidably disposed on the backplate, and the second housing is adapted to abut against the second side of the stretchable display panel. The first housing and the second housing move relative to each other, so that a distance between the first housing and the second housing varies with a distance between the first side and the second side.

10 Claims, 6 Drawing Sheets

(56) References Cited

U.S. PATENT DOCUMENTS

| | | | | |
|---|---|---|---|---|
| 10,817,030 | B2* | 10/2020 | Pelissier | G06F 1/1681 |
| 10,834,814 | B2* | 11/2020 | Cho | G06F 1/1641 |
| 2008/0144265 | A1* | 6/2008 | Aoki | H04M 1/0268 |
| | | | | 361/679.04 |
| 2016/0135284 | A1* | 5/2016 | Choi | G09F 9/301 |
| | | | | 361/749 |
| 2018/0210495 | A1* | 7/2018 | Lin | G06F 1/1616 |
| 2018/0210496 | A1* | 7/2018 | Lin | H04M 1/0214 |
| 2018/0210497 | A1* | 7/2018 | Lin | E05D 11/0054 |
| 2018/0210510 | A1* | 7/2018 | Lin | H04M 1/0216 |
| 2018/0210511 | A1* | 7/2018 | Lin | E05D 11/0054 |
| 2018/0210513 | A1* | 7/2018 | Lin | G06F 1/1681 |
| 2018/0213663 | A1* | 7/2018 | Lin | E05D 11/0054 |
| 2018/0279489 | A1* | 9/2018 | Ochi | H05K 5/0004 |
| 2018/0324964 | A1* | 11/2018 | Yoo | G06F 1/1681 |
| 2019/0005857 | A1* | 1/2019 | Wakata | G09F 9/30 |

FOREIGN PATENT DOCUMENTS

| | | |
|---|---|---|
| KR | 20150016859 | 2/2015 |
| KR | 20160100000 | 8/2016 |
| TW | M493232 | 1/2015 |
| TW | M531172 | 11/2016 |

OTHER PUBLICATIONS

"Office Action of Korea Counterpart Application" with English translation thereof, dated Feb. 8, 2021, p. 1-p. 9.

* cited by examiner

PROTECTIVE CASE

CROSS-REFERENCE TO RELATED APPLICATION

This application claims the priority benefit of Taiwan application serial no. 108206154, filed on May 16, 2019. The entirety of the above-mentioned patent application is hereby incorporated by reference herein and made a part of this specification.

BACKGROUND

Technical Field

The disclosure relates to a protective case, and in particular, to a protective case for an electronic device.

Related Art

With the development of sciences and technologies, electronic devices such as smart phones have been widely used. However, as the function of the electronic device is getting stronger and stronger, in addition to providing a user with a general word processing function, the electronic device can also provide the user with other functions, for example, audio-visual enjoyment. To respond to needs of consumers, an electronic device with a stretchable display panel is developed recently, and the stretchable display panel can be adjusted into different sizes according to the use requirements, thereby enhancing the convenience in use.

However, when carrying the electronic device, a protective case is often used outside the electronic device to protect the electronic device from being impacted or abraded. However, a general protective case has a fixed size, and cannot be applied to an electronic device with a stretchable display panel. Therefore, how to design a protective case for an electronic device with a stretchable display panel is one of problems to be resolved recently in this field.

SUMMARY

The disclosure provides a protective case, including a first housing and a second housing that are adapted to move relative to each other to protect an electronic device with a stretchable display panel.

The protective case for an electronic device is provided in the disclosure. The electronic device includes a stretchable display panel. The stretchable display panel includes a first side and a second side that are opposite to each other. The stretchable display panel is adapted to stretch out or draw back to vary a distance between the first side and the second side. The protective case includes a backplate, a first housing, and a second housing. The backplate includes an accommodating space, where the accommodating space is adapted to accommodate the electronic device. The first housing is slidably disposed on the backplate, and the first housing is adapted to abut against the first side of the stretchable display panel. The second housing is slidably disposed on the backplate, and the second housing is adapted to abut against the second side of the stretchable display panel. When the stretchable display panel stretches out or draws back, the first housing and the second housing are adapted to move relative to each other, so that a distance between the first housing and the second housing varies with the distance between the first side and the second side.

Based on the foregoing, the first housing and the second housing of the protective case provided in the disclosure are adapted to move relative to each other, so that the distance between the first housing and the second housing varies with the distance between the first side and the second side, thereby protecting the electronic device with the stretchable display panel.

In order to make the foregoing characteristics and advantages of the disclosure more obvious and understandable, the following embodiment is cited and illustrated in detail with reference to the accompanying drawings.

DETAILED DESCRIPTION

Figure 1:
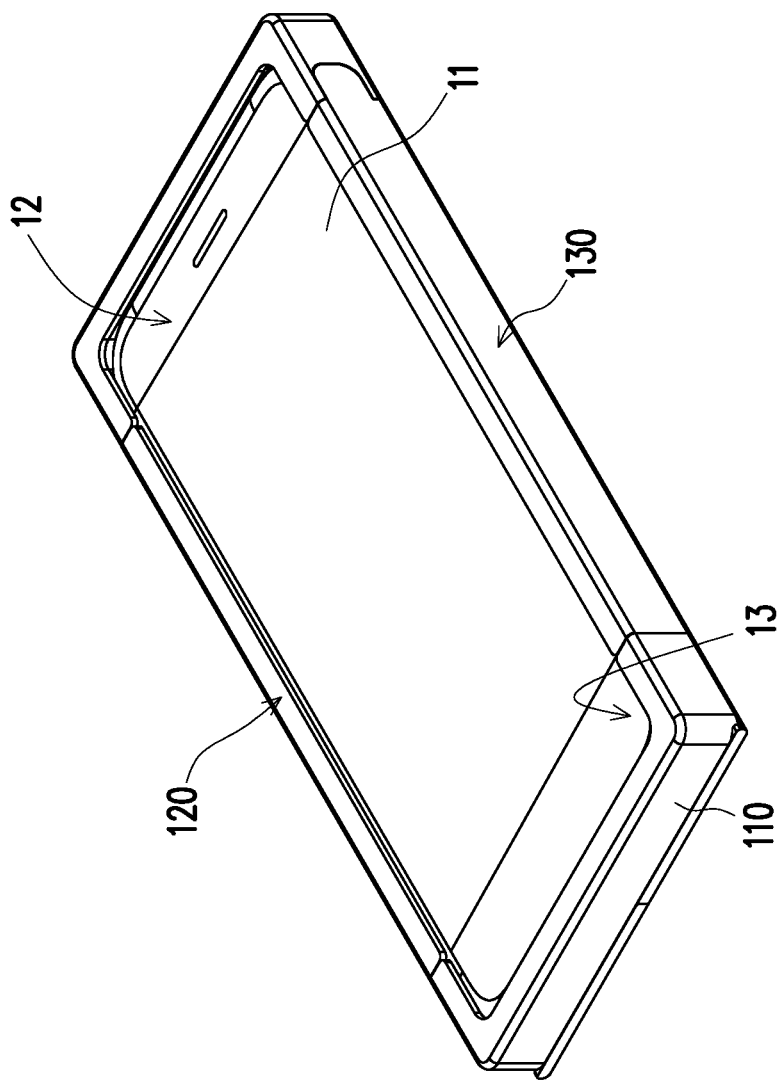
FIG. 1 is a schematic diagram of a protective case applicable to an electronic device according to an embodiment of the disclosure.
Figure 2:
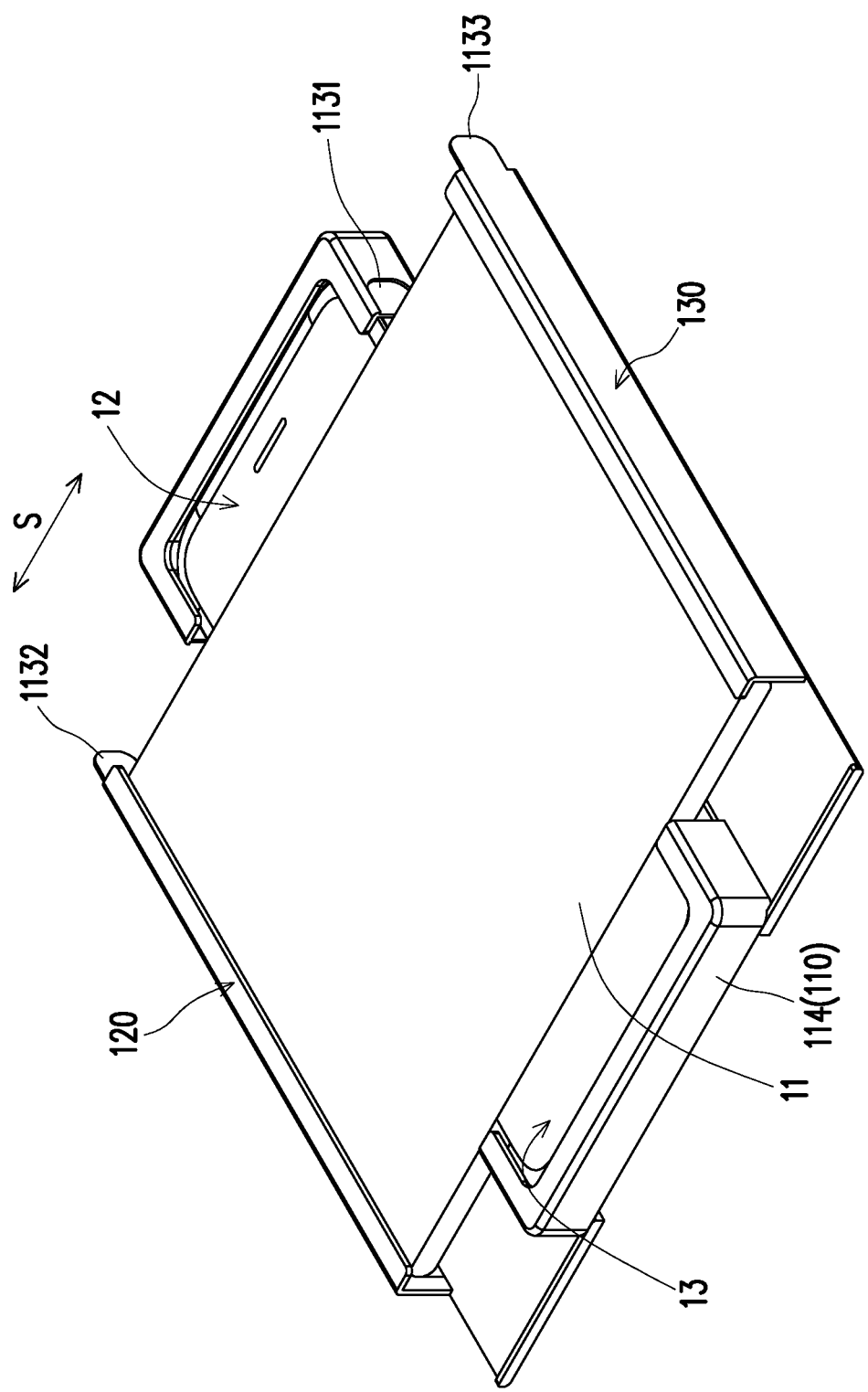
FIG. 2 is a schematic diagram of stretching-out of a stretchable display panel of FIG. 1.
Figure 3:
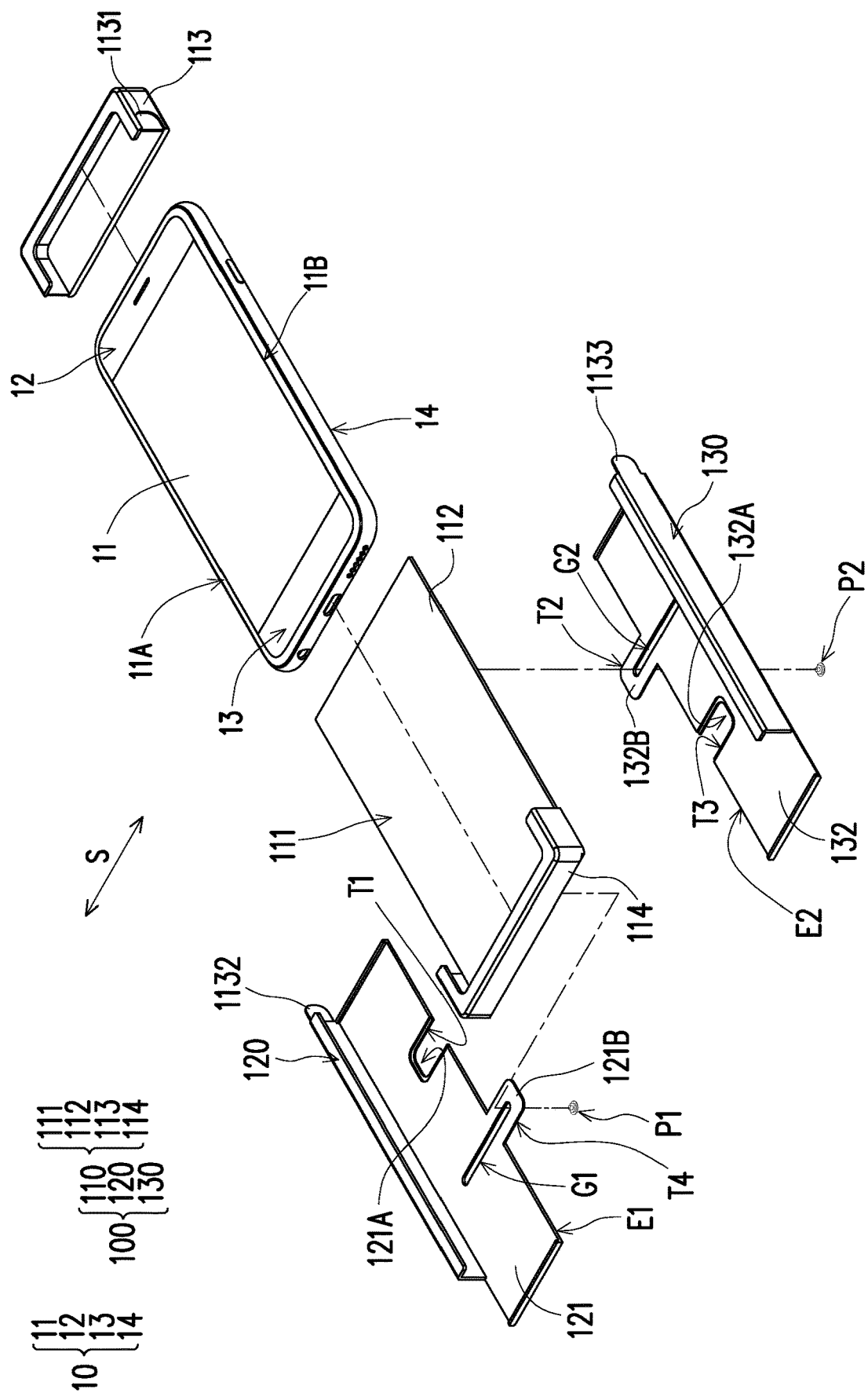
FIG. 3 is a schematic exploded view of the protective case of FIG. 1.
Figure 4:
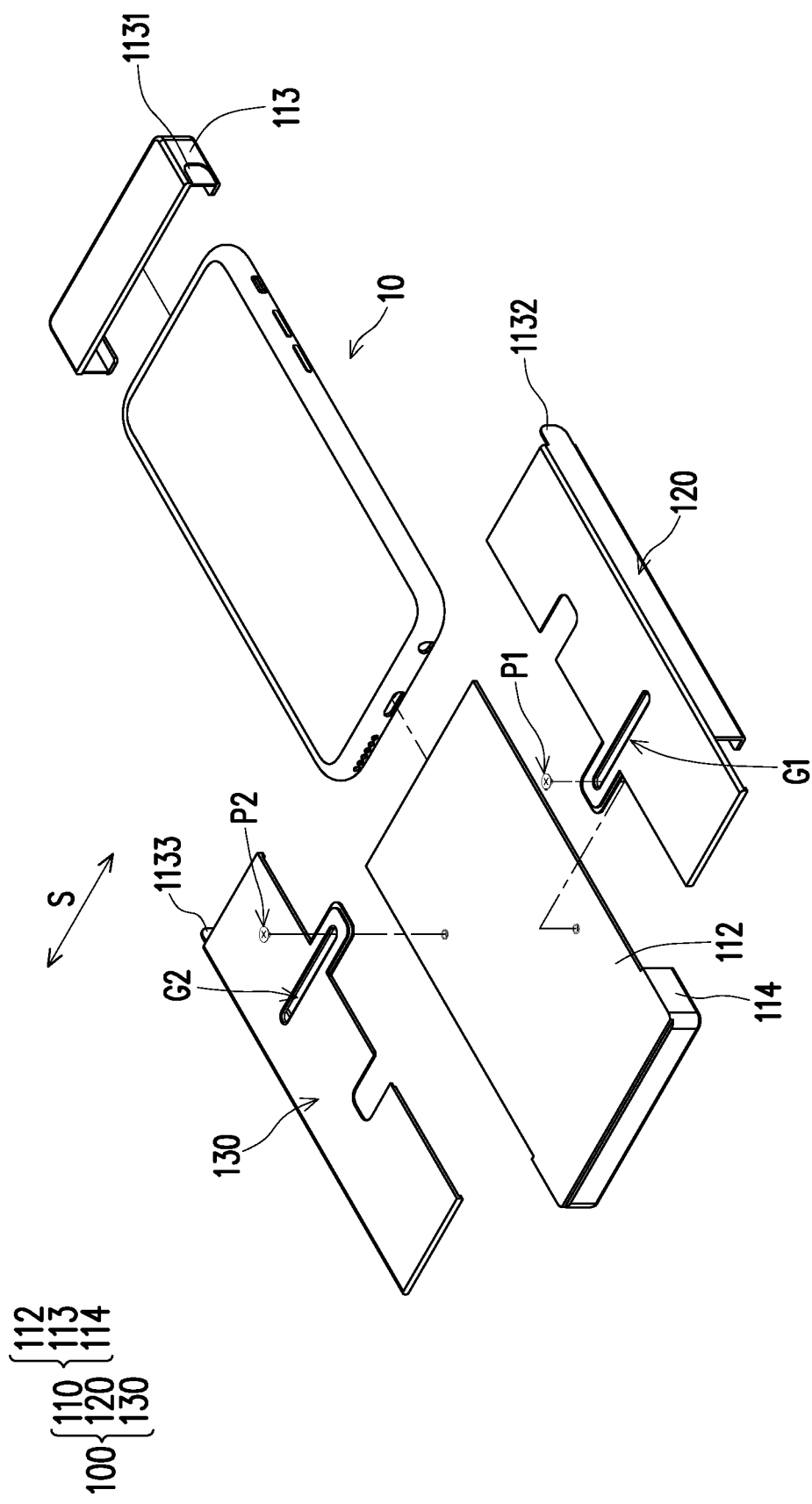
FIG. 4 is a schematic exploded view at another angle of view of FIG. 3.

FIG. 1 is a schematic diagram of a protective case applicable to an electronic device according to an embodiment of the disclosure. FIG. 2 is a schematic diagram of stretching-out of a stretchable display panel of FIG. 1. FIG. 3 is a schematic exploded view of the protective case of FIG. 1. FIG. 4 is a schematic exploded view at another angle of view of FIG. 3. Referring to FIG. 1 to FIG. 4, a protective case 100 according to this embodiment is adapted to cover an electronic device 10. The electronic device 10 according to this embodiment includes a stretchable display panel 11. Herein the electronic device 10 is, for example, a mobile phone, and the stretchable display panel 11 is, for example, a flexible display panel. However, in another embodiment, the electronic device 10 is, for example, a tablet computer, and the type of the electronic device 10 is not limited thereto.

As shown in FIG. 2 and FIG. 3, the protective case 100 according to this embodiment includes a backplate 110, a first housing 120, and a second housing 130. The backplate 110 includes an accommodating space 111, where the accommodating space 111 accommodates the electronic device 10. The stretchable display panel 11 includes a first side 11A and a second side 11B that are opposite to each other. The stretchable display panel 11 stretches out or draws back so that a distance between the first side 11A and the second side 11B can be changed.

In this embodiment, the first housing 120 is slidably disposed on the backplate 110, and the first housing 120 abuts against the first side 11A of the stretchable display panel 11. The second housing 130 is slidably disposed on the backplate 110, and the second housing 130 abuts against the second side 11B of the stretchable display panel 11. When the stretchable display panel 11 stretches out or draws back, the first housing 120 and the second housing 130 move relative to each other, so that a distance between the first housing 120 and the second housing 130 varies with a distance between the first side 11A and the second side 11B.

The manner in which the first housing 120 and the second housing 130 move relative to each other is described in detail below.

As shown in FIG. 3 and FIG. 4, in this embodiment, the first housing 120 includes a first guiding groove G1, and the second housing 130 includes a second guiding groove G2. A first sliding part P1 and a second sliding part P2 are, for example, two step screws. The first sliding part P1 is used to fix the first housing 120 at a board 112 and is used as a sliding medium between the first guiding groove G1 and the board 112. The second sliding part P2 is used to fix the second housing 130 at the board 112 and is used as a sliding medium between the second guiding groove G2 and the board 112. In this embodiment, the first sliding part P1 and the second sliding part P2 respectively pass through the first guiding groove G1 and the second guiding groove G2 to be fixed on the backplate 110 to achieve an effect that the first housing 120 and the second housing 130 are slidably disposed relative to the backplate 110. In this embodiment, the first guiding groove G1 is parallel to the second guiding groove G2 and parallel to an extension direction S in which the stretchable display panel 11 stretches out or draws back, but is not limited thereto in another embodiment.

Definitely, types of the first sliding part P1 and the second sliding part P2 and a manner in which the first sliding part P1 and the second sliding part P2 are engaged with the backplate 110 are not limited thereto. In an embodiment, the backplate 110, the first sliding part P1, and the second sliding part P2 are integrally formed. The first sliding part P1 extends into the first guiding groove G1. The second sliding part P2 extends into the second guiding groove G2 to achieve an effect of slidable configuration. In addition, in another embodiment, the first sliding part P1 and the second sliding part P2 are studs, bumps, or other components that are slidably connected to the first guiding groove G1 and the second guiding groove G2, and are not limited thereto.

In addition, in another embodiment, the first housing 120 and the second housing 130 are slidably connected to the backplate 110 in such a way that one of the first housing 120 and the backplate 110 includes the first sliding part P1, and the other includes the first guiding groove G1; and one of the second housing 130 and the backplate 110 includes the second sliding part P2, and the other includes the second guiding groove G2.

Alternatively, in an embodiment, the first housing 120 is slidably disposed on the second housing 130 directly, that is, one of the first housing 120 and the second housing 130 includes a guiding groove, and the other includes a sliding part. Definitely, the manner in which the first housing 120 and the second housing 130 move relative to each other is not limited to the foregoing.

The protective case 100 according to this embodiment is slidably disposed on the backplate 110 by using the first housing 120 and the second housing 130. In this way, a width of the protective case 100 is not limited to a certain distance, but varies with a degree of stretching-out or drawing-back of the stretchable display panel 11, to protect the electronic device 10 with the stretchable display panel 11.

Referring to FIG. 3, more specifically, in this embodiment, the first housing 120 includes a first planar part 121. The first planar part 121 includes a first border E1, a first notch part 121A concaved at the first border E1, and a first protruding part 121B protruding from the first border E1. The first guiding groove G1 is arranged on the first protruding part 121B and extends in a direction opposite to the first border E1.

In this embodiment, the second housing 130 includes a second planar part 132. The second planar part 132 includes a second border E2, a second notch part 132A concaved at the second border E2, and a second protruding part 132B protruding from the second border E2. The second guiding groove G2 is arranged on the second protruding part 132B and extends in a direction opposite to the second border E2.

In this embodiment, an inner contour T1 of the first notch part 121A is conformal to an outer contour T2 of the second protruding part 132B, and an inner contour T3 of the second notch part 132A is conformal to an outer contour T4 of the first protruding part 121B, so that the first notch part 121A accommodates the second protruding part 132B, and the second notch part 132A accommodates the first protruding part 121B. According to this, the first housing 120 and the second housing 130 are located at a same plane to make the protective case 100 thin, and applicable to the electronic device 10 with the stretchable display panel 11 which is able to extend to twice the size of the display panel.

Definitely, in another embodiment, the first housing 120 and the second housing 130 are superimposed to cover the backplate 110, so that the protective case 100 is applicable to the electronic device 10 with the stretchable display panel 11 which is able to extend to three times the size of the display panel, but is not limited to the foregoing.

In addition, in this embodiment, the backplate 110 further includes the board 112, and a first covering part 113 and a second covering part 114 that are connected to the board 112. The electronic device 10 includes an upper end 12 and a lower end 13 that are opposite to each other, and a bottom 14 between the upper end 12 and the lower end 13. The first covering part 113 abuts against the upper end 12, the second covering part 114 abuts against the lower end 13, and the bottom 14 is supported by the board 112.

That is, the board 112 is attached to the bottom 14 of the electronic device 10, the first covering part 113 includes an accommodating space fitting the upper end 12, and the second covering part 114 includes an accommodating space fitting the lower end 13, to completely cover the electronic device 10, thereby achieving purposes such as fall protection and scratch proof.

In this embodiment, the first covering part 113, the second covering part 114, and the board 112 are, for example, hard housings made of plastic, metal or other hard materials. The first covering part 113 is detachably connected to the board 112 to be assembled on the electronic device 10 conveniently. In addition, the second covering part 114 and the board 112 are integrally formed to improve the protection performance of the protective case 100.

Definitely, in another embodiment, the first covering part 113, the second covering part 114, and the board 112 are soft housings made of rubber, silicone, or other flexible materials, where the first covering part 113, the second covering part 114, and the board 112 are integrally formed to eliminate assembly steps; the connection manners or materials of the first covering part 113, the second covering part 114, and the board 112 are different according to requirements on the manufacturing process, and are not limited thereto.

In addition, to ensure that the first housing 120 and the second housing 130 are steadily kept at positions relative to the backplate 110 when the stretchable display panel 11 is not unfolded, in this embodiment, as shown in FIG. 2, the first covering part 113 includes two grooves 1131 that are concaved on an outer surface of the first covering part 113 and respectively face the first housing 120 and the second housing 130. The first housing 120 includes a first fixture block 1132, and the second housing 130 includes a second fixture block 1133. The two grooves 1131 correspond to the first fixture block 1132 and the second fixture block 1133 respectively, so that the first fixture block 1132 and the second fixture block 1133 are clamped in the two grooves 1131 respectively to locate the first housing 120 and the second housing 130 at the first covering part 113.

When a user intends to unfold the stretchable display panel 11, as long as a force is applied to release fixing relationships of the first housing 120 and the second housing 130 relative to the backplate 110, the first housing 120 and the second housing 130 are expanded together with the stretchable display panel 11, so that the protective case 100 still protects the electronic device 10 when the stretchable display panel 11 is stretching-out. In this embodiment, the first housing 120 and the second housing 130 are located at the first covering part 113 in a clamping manner, but the disclosure is not limited thereto.

Figure 5:
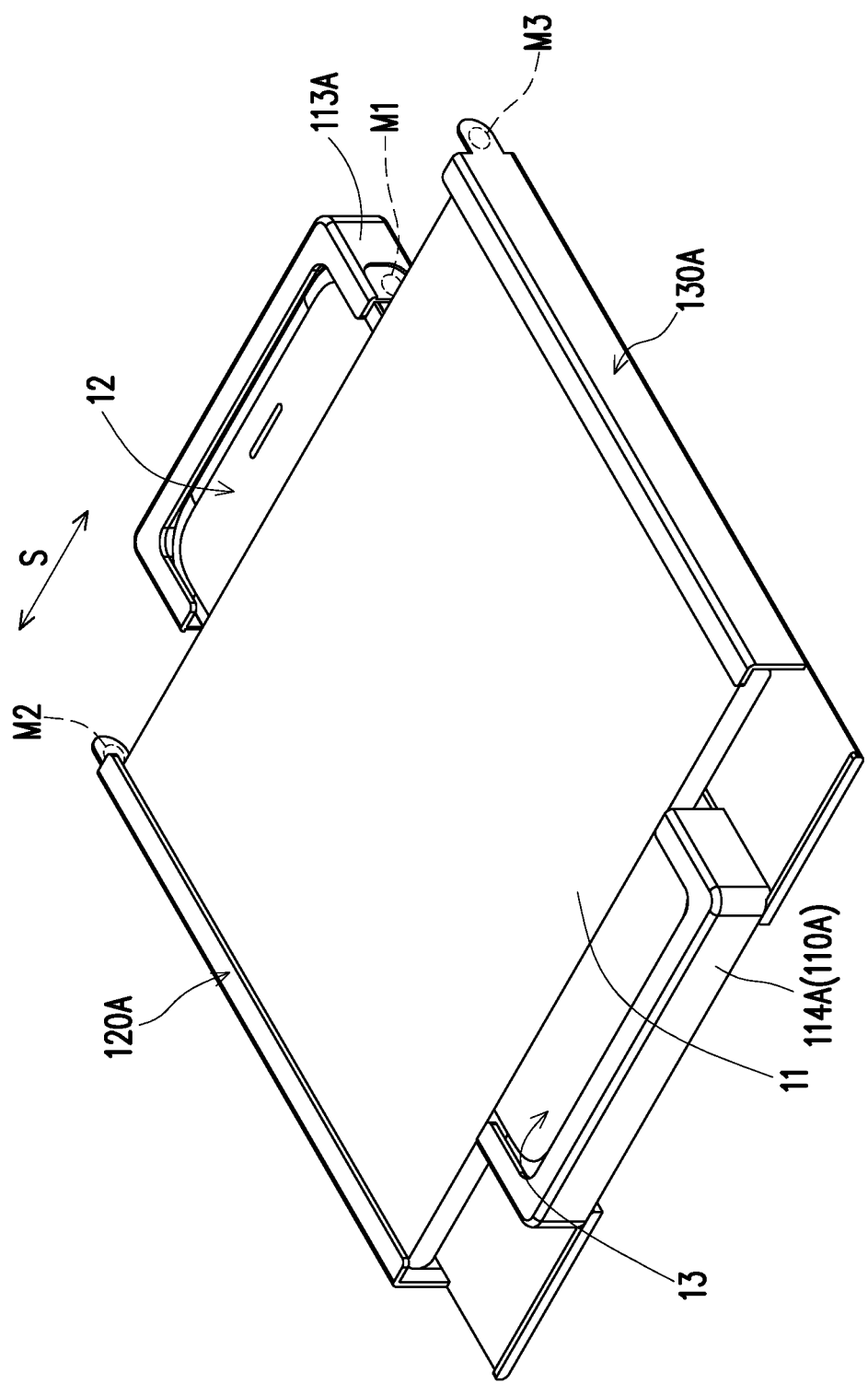
FIG. 5 is a schematic diagram of a protective case applicable to an electronic device according to another embodiment of the disclosure.

FIG. 5 is a schematic diagram of a protective case applicable to an electronic device according to another embodiment of the disclosure. Referring to FIG. 5, in this embodiment, a first housing 120A and a second housing 130A of a protective case 100A are located at a first covering part 113A in a magnetically attraction manner.

In this embodiment, the first covering part 113A of a backplate 110A includes two first magnetic elements M1 that are located at an outer surface of the first covering part 113A and face the first housing 120A and the second housing 130A respectively. The first housing 120A includes a second magnetic element M2, and the second housing 130A includes a third magnetic element M3. These first magnetic elements M1 correspond to the second magnetic element M2 and the third magnetic element M3 respectively, so that the two first magnetic elements M1 magnetically attract the second magnetic element M2 and the third magnetic element M3 respectively to locate the first housing 120A and the second housing 130A at the first covering part 113A.

In this embodiment, the first housing 120A and the second housing 130A are located at the first covering part 113A by using the first magnetic elements M1, the second magnetic element M2, and the third magnetic element M3, but are not limited thereto in another embodiment.

Figure 6:
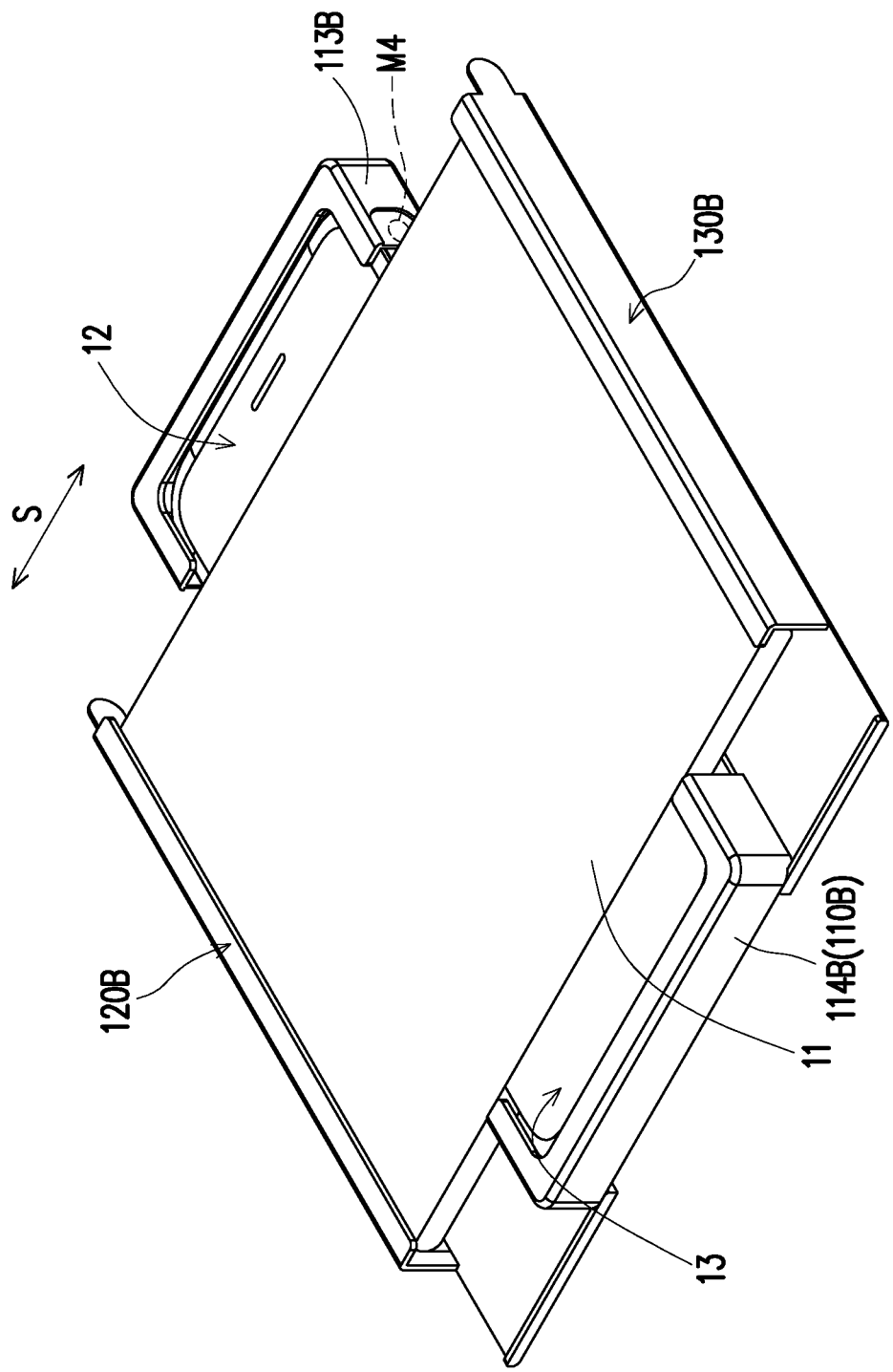
FIG. 6 is a schematic diagram of a protective case applicable to an electronic device according to another embodiment of the disclosure.

FIG. 6 is a schematic diagram of a protective case applicable to an electronic device according to another embodiment of the disclosure. Referring to FIG. 6, in this embodiment, a first housing 120B and a second housing 130B of a protective case 100B are located at a first covering part 113B of a backplate 110B in such a way that the first covering part 113B includes two fourth magnetic elements M4, the first housing 120B and the second housing 130B are made of magnetic metals, for example, iron, nickel, and cobalt, so that the two fourth magnetic elements M4 of the first covering part 113B are attached to the first housing 120B and the second housing 130B, and the first housing 120B and the second housing 130B are located at the first covering part 113B. However, in another embodiment, the first housing 120B and the second housing 130B each include a fourth magnetic element M4, and the first covering part 113B is made of magnetic metal, but is not limited thereto.

To sum up, the first housing and the second housing of the protective case provided in the disclosure are adapted to move relative to each other, the first housing abuts against the first side of the stretchable display panel, and the second housing abuts against the second side of the stretchable display panel, so that a distance between the first housing and the second housing varies with a distance between the first side and the second side of the stretchable display panel. In this way, the protective case is adaptive to the change of stretching-out or drawing-back of the stretchable display panel to protect the electronic device with the stretchable display panel.

Although the disclosure has been disclosed as mentioned in the embodiment, it is not intended to limit the disclosure. Any person with general knowledge in the technical field of the disclosure can make some changes and modifications without deviating from the spirit and scope of the disclosure, so the protection scope of the disclosure shall be subject to the definition of the attached claims.

What is claimed is:

1. A protective case for an electronic device, wherein the electronic device comprises a stretchable display panel, the stretchable display panel comprises a first side and a second side opposite to each other, the stretchable display panel is adapted to stretch out or draw back to vary a distance between the first side and the second side, and the protective case comprises:
   a backplate, comprising an accommodating space, wherein the accommodating space is adapted to accommodate the electronic device;
   a first housing, comprising a first planar part and slidably disposed on the backplate, wherein the first housing is adapted to abut against the first side of the stretchable display panel; and
   a second housing, comprising a second planar part and slidably disposed on the backplate, wherein the second housing is adapted to abut against the second side of the stretchable display panel,
   wherein when the stretchable display panel stretches out or draws back, the first housing and the second housing move relative to each other, so that a distance between the first housing and the second housing varies with the distance between the first side and the second side,
   the first planar part comprises a first border, the second planar part comprises a second border, the first border is complementary to the second border on a plane, and the first planar part and the second planar part are disposed on a side of the backplate opposite to the accommodating space.

2. The protective case according to claim 1, wherein one of the first housing and the backplate comprises a first sliding part at a place on which the first housing and the backplate face each other, the other comprises a first guiding groove, and the first sliding part extends into the first guiding groove.

3. The protective case according to claim 2, wherein the first guiding groove is parallel to an extension direction in which the stretchable display panel stretches out or draws back.

4. The protective case according to claim 1, wherein the backplate further comprises a board, a first covering part and a second covering part, the first covering part and the second covering part are connected to the board; the electronic device comprises an upper end, a lower end opposite to the upper end and a bottom between the upper end and the lower end; the first covering part abuts against the upper end, the second covering part abuts against the lower end, and the bottom is supported by the board.

5. The protective case according to claim 4, wherein the first covering part is detachably connected to the board, and the second covering part and the board are integrally formed.

6. The protective case according to claim 4, wherein the first covering part, the second covering part, and the board are integrally formed.

7. The protective case according to claim 4, wherein the first covering part comprises two grooves, the two grooves are concaved on an outer surface of the first covering part and respectively face the first housing and the second housing, the first housing comprises a first fixture block, the second housing comprises a second fixture block, and the two grooves correspond to the first fixture block and the second fixture block respectively, so that the two grooves are adapted to clamp the first fixture block and the second fixture block respectively to locate the first housing and the second housing at the first covering part.

8. The protective case according to claim 4, wherein the first covering part comprises two first magnetic elements, the two first magnetic elements are located at an outer surface of the first covering part and face the first housing and the second housing; the first housing comprises a second magnetic element, and the second housing comprises a third magnetic element, the two first magnetic elements correspond to the second magnetic element and the third magnetic element respectively, so that the two first magnetic elements are adapted to magnetically attract the second magnetic element and the third magnetic element respectively to locate the first housing and the second housing at the first covering part.

9. The protective case according to claim 4, wherein the first covering part comprises two fourth magnetic elements, the two fourth magnetic elements are located at an outer surface of the first covering part and respectively face the first housing and the second housing, and the first housing and the second housing are made of magnetic metals.

10. The protective case according to claim 1, wherein the first planar part further comprises a first notch part concaved on the first border, and a first protruding part protruding from the first border, the second planar part further comprises a second notch part concaved on the second border, and a second protruding part protruding from the second border; the first notch part corresponds to the second protruding part, and the second notch part corresponds to the first protruding part, so that the first notch part is adapted to accommodate the second protruding part, and the second notch part is adapted to accommodate the first protruding part.

\* \* \* \* \*